US011518866B2

(12) United States Patent
Sauvage et al.

(10) Patent No.: US 11,518,866 B2
(45) Date of Patent: Dec. 6, 2022

(54) PEROXY ESTER CURE OF LIQUID PREPOLYMER COMPOSITIONS

(71) Applicant: Arkema Inc., King of Prussia, PA (US)

(72) Inventors: Marine Sauvage, Montpellier (FR); Thomas H. Kozel, Pottstown, PA (US); Dana Lee Swan, Norristown, PA (US); Nathan John Bachman, West Chester, PA (US)

(73) Assignee: ARKEMA INC., King of Prussia, PA (US)

( * ) Notice: Subject to any disclaimer, the term of this patent is extended or adjusted under 35 U.S.C. 154(b) by 304 days.

(21) Appl. No.: 15/779,886

(22) PCT Filed: Nov. 30, 2016

(86) PCT No.: PCT/US2016/064167
§ 371 (c)(1),
(2) Date: May 30, 2018

(87) PCT Pub. No.: WO2017/095893
PCT Pub. Date: Jun. 8, 2017

(65) Prior Publication Data
US 2018/0355133 A1   Dec. 13, 2018

Related U.S. Application Data

(60) Provisional application No. 62/261,962, filed on Dec. 2, 2015.

(51) Int. Cl.
*C08K 5/00* (2006.01)
*C08K 7/02* (2006.01)
(Continued)

(52) U.S. Cl.
CPC ............ *C08K 5/14* (2013.01); *C08J 5/10* (2013.01); *C08J 5/249* (2021.05); *C08K 5/0025* (2013.01);
(Continued)

(58) Field of Classification Search
CPC ... C08J 5/10; C08J 5/24; C08J 2333/12; C08J 5/04; C08K 5/14; C08K 5/17; C08K 5/37;
(Continued)

(56) References Cited

U.S. PATENT DOCUMENTS

| 3,234,194 A | 2/1966 | Slocum |
| 3,287,155 A | 11/1966 | Munn |

(Continued)

FOREIGN PATENT DOCUMENTS

| WO | WO-2014013028 A1 * | 1/2014 | ............. C08J 5/24 |
| WO | WO-2015110549 A1 * | 7/2015 | ............. C08J 5/042 |

*Primary Examiner* — Christopher M Polley
*Assistant Examiner* — Sathavaram I Reddy
(74) *Attorney, Agent, or Firm* — Buchanan Ingersoll & Rooney P.C.

(57) ABSTRACT

Liquid resin compositions that can be used in the manufacture of composite materials are described. A method of making a fiber-reinforced polymeric composite material comprises wetting a fibrous material with a liquid prepolymer composition comprising at least one (meth)acrylic monomer, at least one base, and at least one peroxy ester; and polymerizing the liquid prepolymer composition to form a fiber-reinforced polymeric composite material.

10 Claims, 1 Drawing Sheet

(51) Int. Cl.
  *C08J 5/24*   (2006.01)
  *C08J 5/10*   (2006.01)
  *C08K 5/14*   (2006.01)
  *C08K 5/17*   (2006.01)
  *C08K 5/37*   (2006.01)

(52) U.S. Cl.
  CPC ............... *C08K 5/17* (2013.01); *C08K 5/37* (2013.01); *C08K 7/02* (2013.01); *C08J 2333/12* (2013.01)

(58) Field of Classification Search
  CPC ......... C08K 5/0025; C08K 7/02; C08L 33/12; C08L 33/14; C08L 35/00
  See application file for complete search history.

(56) References Cited

U.S. PATENT DOCUMENTS

| | | | | |
|---|---|---|---|---|
| 3,362,942 | A * | 1/1968 | Munu | C08F 265/06 525/274 |
| 3,741,942 | A | 6/1973 | Crivello | |
| 4,189,451 | A | 2/1980 | Dudinyak | |
| 4,197,215 | A | 4/1980 | Dudinyak | |
| 6,552,130 | B1 * | 4/2003 | Makino | C08F 4/00 525/227 |
| 9,777,140 | B2 | 10/2017 | Gerard et al. | |
| 2011/0319564 | A1 * | 12/2011 | Corley | C08G 59/5006 525/132 |
| 2015/0218362 | A1 | 8/2015 | Gerard et al. | |
| 2016/0304684 | A1 * | 10/2016 | Ellinger | B29C 70/521 |
| 2017/0002207 | A1 | 1/2017 | Gerard et al. | |

* cited by examiner

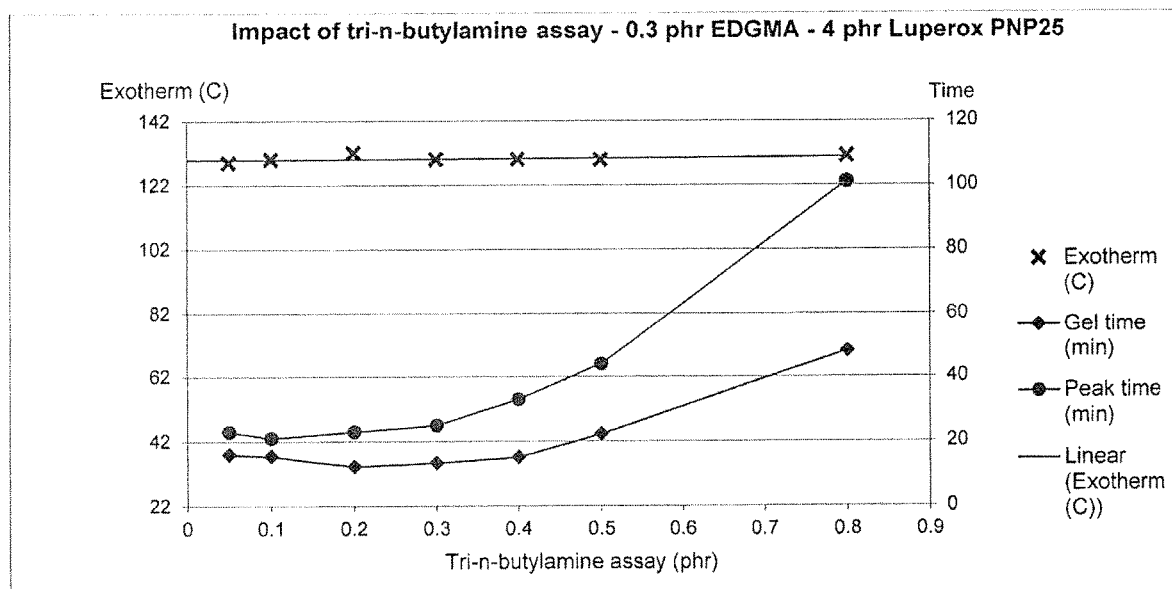

PEROXY ESTER CURE OF LIQUID PREPOLYMER COMPOSITIONS

This application is related to and claims the benefit of U.S. Provisional Application No. 62/261,962, entitled PEROXY ESTER CURE OF LIQUID PREPOLYMER COMPOSITIONS filed on Dec. 2, 2015, the contents of which are incorporated herein by reference.

FIELD OF THE INVENTION

The present invention relates to liquid acrylic thermoplastic resins for composite applications, and methods of making the same.

BACKGROUND OF THE INVENTION

Mechanical or structured parts that have to absorb high stresses during their use are widely manufactured from composite materials. A composite material is a macroscopic combination of two or more materials. Typically, a composite material comprises a matrix material that forms a continuous phase for the cohesion of the structure, and a reinforcing material with various architectures for the mechanical properties.

Composite materials are widely used in several industrial sectors; for example, building, automotive, aerospace, transport, leisure, electronics, and sports. Composite materials are often considered to provide better mechanical performance (e.g., higher tensile strength, higher tensile modulus, higher fracture toughness, etc.) in comparison to homogenous materials with lower density.

On the commercial industrial scale, the most important class of composites by volume are composites with organic matrices, wherein the matrix material is a polymer. The principal matrix or continuous phase of a polymeric composite material is typically either a thermoplastic polymer or a thermosetting polymer. In order to prepare a polymeric composite material, the prepolymer is typically mixed with the other component, such as glass beads or fibers, which become wetted or impregnated with the prepolymer, and the composition is subsequently cured.

A major disadvantage of a thermoset polymer matrix is its rigidity. Once the polymer has been cured, the form is fixed, such that the matrix cannot be easily shaped into other forms. This also makes it difficult to recycle thermoset composite materials. In contrast, thermoplastic polymers can soften or become less viscous when heated, and can take on new shapes by the application of heat and/or pressure. However, a drawback in using thermoplastic polymers for the fabrication of composite materials is that they have a high viscosity in the molten state, which makes it difficult to homogenously wet or impregnate a substrate, such as a fibrous substrate. The wetting or impregnation of fibers by the thermoplastic polymer can only be achieved if the thermoplastic resin is sufficiently fluid. In order to have a low viscosity or sufficient fluidity of the thermoplastic polymer, the chain length or molecular mass is often reduced. However, a molecular weight that is too low can have a negative impact on the performance of the composite material and on resulting structured parts, especially on mechanical properties such as deformation modulus.

Methods for making polymers, some of which can be used to make composite materials, have previously been described:

U.S. Pat. Nos. 3,362,942, 4,189,451 and 4,197,215 are directed to processes for polymerizing and curing methyl methacrylate monomer-polymer syrups in the presence of metal salts of hemi-peresters of maleic acid; and U.S. Pat. No. 6,552,130 is directed to a resin composition that is suitable for use as a covering material for civil engineering and construction applications.

WO2013/056845 A2 is directed to a composite material via in-situ polymerization and its use and is incorporated herein in its entirety.

WO2014/013028 A1 is directed to impregnation process for a fibrous substrate and a liquid (meth)acrylic syrup for the impregnation process, and articles obtained from it and is incorporated herein in its entirety.

For at least the reasons described above, there remains a need for improved composite materials that can be fabricated using thermoplastic polymers, and efficient methods for manufacturing the composite materials.

SUMMARY OF THE INVENTION

It has previously been difficult to develop methods for making composite materials comprising thermoplastic polymers, particularly due to the high viscosity of thermoplastic polymers when they are in a molten state. The applicants have developed methods for making high strength composite materials that have the mechanical advantages of thermoset resins but maintain the post-processability and recyclability of a thermoplastic composite. According to embodiments of the invention, the use of a liquid acrylic thermoplastic resin for composite applications allows for the processing of high strength composites via traditional techniques used with liquid thermoset resins, such as closed mold techniques including infusion and resin transfer molding (RTM). According to embodiments of the present invention, the use of a peroxy maleic acid initiator and a base promoter to cure acrylic resins at room temperature provides several unexpected benefits, including an initiator system with excellent shelf stability of the initiator, dispersion of the initiator without agitation, viscosities that are suitable for infusion, and rapid cure time of composite parts. According to one embodiment, when a peroxy maleic acid dispersion is utilized with ethylene glycol dimercaptoacetate as a co-promoter and a base (e.g., tri-n-butylamine) as a promoter, a thermoplastic resin can be cured within about 10 minutes to about 15 minutes at room temperature. Unlike prior art systems, embodiments of the invention utilize a liquid promoter, such as tri-n-butylamine, and water does not have to be added to the system.

Embodiments of the present invention relate to a liquid resin composition comprising:
  at least one (meth)acrylic monomer,
  at least one base, and
  at least one mercaptan compound.

Embodiments of the present invention also relate to a method of making a fiber-reinforced polymeric composite material comprising:
  wetting a fibrous material with a liquid prepolymer composition comprising at least one (meth)acrylic monomer, at least one base, and at least one peroxy ester moiety which is an initiator; and
  polymerizing the liquid prepolymer composition to form a fiber-reinforced polymeric composite material.

Embodiments of the present invention also relate to fiber-reinforced polymeric composite materials made by the aforesaid method.

Embodiments of the present invention also relate to peroxy ester moieties wherein the moiety is a peroxy ester initiator compositions useful for making the fiber-reinforced polymeric composite materials of the invention comprising:
 at least one peroxy ester; and
 at least one organic amine.

DESCRIPTION OF THE DRAWINGS

FIG. 1 illustrates the cure times of Elium® resin with 0.3 phr ethylene glycol dimercaptoacetate (EGDMA), 4 phr Luperox® PNP25 and various amounts of tri-n-butylamine, in accordance with particular embodiments of the present invention.

DETAILED DESCRIPTION

Embodiments of the present invention provide a liquid resin composition comprising, consisting essentially of, or consisting of at least one (meth)acrylic monomer, at least one base, at least one mercaptan compound, and optionally at least one (meth)acrylic polymer.

Additional embodiments of the present invention provide a method of making a fiber-reinforced polymeric composite material comprising, consisting essentially of, or consisting of:
 wetting a fibrous material with a liquid prepolymer composition, wherein the liquid prepolymer composition comprises at least one (meth)acrylic monomer, at least one base, at least one peroxy ester, and optionally at least one (meth)acrylic polymer; and
 polymerizing the liquid prepolymer composition to form a fiber-reinforced polymeric composite material. According to particular embodiments, the wetting and polymerizing steps occur in a closed mold. For example, an infusion or resin transfer molding (RTM) technique may be utilized. The polymerizing step preferably occurs at room temperature.

According to particular embodiments, the amount of time that it takes the composition to cure at room temperature is between about 7 minutes and about 120 minutes, or between about 7 minutes and about 100 minutes, or between about 7 minutes and about 80 minutes, or between about 7 minutes and about 60 minutes, or between about 7 minutes and about 40 minutes, or between about 10 minutes and about 20 minutes, or between about 10 minutes and about 18 minutes, or between about 10 minutes and about 15 minutes.

As used herein, a "(meth)acrylic monomer" refers to acrylic and methacrylic monomers.

As used herein, a "thermoplastic polymer" refers to a polymer that can turn to a liquid or become less viscous when heated, and that can take on new shapes by the application of heat and/or pressure.

As used herein, a "composite" refers to a multicomponent material comprising at least two different components, wherein at least one component is a polymer. Preferably, the other component is a fibrous material.

As used herein, "wetting" refers to a process by which a solid material is contacted with a liquid and impregnated by the liquid; for example, a process by which a fibrous material is contacted with a liquid prepolymer and the liquid prepolymer penetrates the fibrous material.

As used herein, a "fibrous material" refers to woven or non-woven material comprising, consisting essentially of, or consisting of an assembly of fibers. A fibrous material can have different forms and dimensions; for example, one-dimensional, two-dimensional or three-dimensional. The fibrous material can be natural or synthetic. Non-limiting examples of natural materials include vegetable fibers, wood fibers, animal fibers (e.g., wool or hair) and mineral fibers. Non-limiting examples of synthetic materials include polymeric fibers chosen from fibers of thermosetting polymers, thermoplastic polymers or their mixtures. Non-limiting examples of mineral fibers include glass fibers, carbon fibers, boron fibers and silica fibers.

As used herein, "room temperature" refers to about 20° C. to about 30° C. (about 68° F. to about 86° F.), more preferably about 25° C. (about 77° F.).

As described herein, the liquid resin compositions and liquid prepolymer compositions of the present invention comprise at least one (meth)acrylic monomer and optionally at least one (meth)acrylic polymer, such as PMMA. As used herein, "PMMA" refers to homo- and copolymers of methylmethacrylate (MMA), and mixtures thereof.

According to particular embodiments, the at least one (meth)acrylic monomer is chosen from acrylic acid, methacrylic acid, alkyl acrylic monomers, alkyl methacrylic monomers and mixtures thereof. For example, the (meth)acrylic monomer(s) may be chosen from acrylic acid, methacrylic acid, alkyl acrylic monomers, alkyl methacrylic monomers and mixtures thereof, the alkyl group having from 1 to 22 carbons, either linear, branched or cyclic; preferably the alkyl group having from 1 to 12 carbons, either linear, branched or cyclic. Preferably, the (meth)acrylic monomer(s) are chosen from methyl methacrylate, ethyl methacrylate, methyl acrylate, ethyl acrylate, methacrylic acid, acrylic acid, n-butyl acrylate, iso-butyl acrylate, n-butyl methacrylate, iso-butyl methacrylate, cyclohexyl acrylate, cyclohexyl methacrylate, isobornyl acrylate, isobornyl methacrylate and mixtures thereof.

According to particular embodiments, at least one (meth)acrylic monomer is present in an amount of between about 40% and about 95% by weight, or between about 40% and about 90% by weight, or between about 40% and about 85% by weight, or between about 40% and about 80% by weight, or between about 50% and about 95% by weight, or between about 50% and about 90% by weight, or between about 50% and about 85% by weight, or between about 50% and about 80% by weight, between about 60% and about 95% by weight, or between about 60% and about 90% by weight, or between about 60% and about 85% by weight, or between about 60% and about 80% by weight, by weight of the total (meth)acrylic monomer and (meth)acrylic polymer in the liquid resin or "prepolymer" composition.

According to particular embodiments, the at least one (meth)acrylic polymer may be present in an amount of between about 5% and about 60% by weight, or between about 10% and about 60% by weight, or between about 15% and about 60% by weight, or between about 20% and about 60% by weight, or between about 5% and about 50% by weight, or between about 10% and about 50% by weight, or between about 15% and about 50% by weight, or between about 20% and about 50% by weight, between about 5% and about 40% by weight, or between about 10% and about 40% by weight, or between about 15% and about 40% by weight, or between about 20% and about 40% by weight, by weight of the total (meth)acrylic monomer and (meth)acrylic polymer.

According to particular embodiments, the at least one meth(acrylic) polymer is PMMA, and the PMMA comprises at least about 70%, at least about 80%, at least about 90%, or at least about 95% by weight of methyl methacrylate, or a mixture of at least one homopolymer and at least one copolymer of MMA, or a mixture of at least two homopolymers or two copolymers of MMA with a different average molecular weight or a mixture of at least two copolymers of MMA with a different monomer composition.

According to additional embodiments, a copolymer of methyl methacrylate (MMA) comprises from about 70% to about 99.7%, or from about 80% to about 99.7%, or from about 90% to about 99.7%, or from about 90% to about 99.5% by weight of methyl methacrylate and from about 0.3 to about 30%, or from about 0.3 to about 20%, or from about 0.3 to about 10%, or from about 0.5 to about 10% by weight of at least one monomer having at least one ethylenic unsaturation that can copolymerize with methyl methacrylate.

According to particular embodiments, the at least one base in the liquid resin or "prepolymer" composition comprises at least one metal salt and/or at least one organic amine. Non-limiting examples of metal salts include alkali and alkaline earth oxides and hydroxides. Non-limiting examples of organic amines include tertiary amines such as tri-n-butylamine, tri-n-ethylamine, N,N-dimethylaniline, N,N-diethylhydroxylamine, (N,N-bis-(2-hydroxyethyl)-para-toluidine) (e.g., Bisomer® PTE), or a combination thereof. Preferably, the at least one organic amine comprises one or more trialkyl amines, such as tri-n-butylamine. The amount of the at least one organic amine in the liquid resin or "prepolymer" composition may be between about 0.01 phr and about 1.0 phr, or between about 0.01 phr and about 0.7 phr, or between about 0.01 phr and about 0.5 phr, or between about 0.01 phr and about 0.3 phr, or between about 0.05 phr and about 1.0 phr, or between about 0.05 phr and about 0.7 phr, or between about 0.05 phr and about 0.5 phr, or between about 0.05 phr and about 0.3 phr, or between about 0.1 phr and about 1.0 phr, or between about 0.1 phr and about 0.7 phr, or between about 0.1 phr and about 0.5 phr, or between about 0.1 phr and about 0.3 phr.

According to particular embodiments, the liquid resin or "prepolymer" composition further comprises at least one mercaptan compound. Non-limiting examples of mercaptan compounds include thiols such as n-dodecyl mercaptan, t-dodecyl mercaptan, octadecyl mercaptan, dipentene dimercaptan, 2-mercaptoethanol, alkyl mercaptoacetates, ethylene glycol dimercaptoacetate, ethylene bis-(beta-mercaptopropionate), trimethylolethane trithioglycolate, trimethylolpropane trithioglycolate, pentaerythritol tetrathioglycolate, 1,8-dimercapto-3,6-dioxaoctane and a combination thereof. According to preferred embodiments, the liquid prepolymer composition comprises ethylene glycol dimercaptoacetate. The amount of the at least one mercaptan compound in the liquid resin or "prepolymer" composition may be between about 0.01 phr and about 1.0 phr, or between about 0.01 phr and about 0.7 phr, or between about 0.01 phr and about 0.5 phr, or between about 0.01 phr and about 0.3 phr, or between about 0.05 phr and about 1.0 phr, or between about 0.05 phr and about 0.7 phr, or between about 0.05 phr and about 0.5 phr, or between about 0.05 phr and about 0.3 phr, or between about 0.1 phr and about 1.0 phr, or between about 0.1 phr and about 0.7 phr, or between about 0.1 phr and about 0.5 phr, or between about 0.1 phr and about 0.3 phr.

Peroxy esters suitable for use in the present invention include, for example, t-alkyl esters of peroxycarboxylic acids, t-alkyl esters of monoperoxydicarboxylic acids, di(t-alkyl) esters of diperoxydicarboxylic acids, alkylene diesters of peroxycarboxylic acids and OO-t-alkyl O-alkyl diesters of monoperoxycarbonic acids. According to particular embodiments, the at least one peroxy ester comprises an ester (in particular, a t-alkyl ester) of peroxymaleic acid. Non-limiting examples of peroxy ester(s) include t-butyl peroxymaleic acid, t-amyl peroxymaleic acid, t-butyl peroxysuccinic acid, t-amyl peroxysuccinic acid, t-butyl peroxyfumaric acid, t-amyl peroxyfumaric acid, or a combination thereof. Preferably, the at least one peroxy ester comprises a hemi ester of a peroxy dicarboxylic acid. The amount of the at least one peroxy ester in the liquid resin or "prepolymer" composition may be between about 0.01 phr to about 4.0 phr, or between about 0.1 phr to about 1.5 phr, in terms of pure peroxide.

Embodiments of the present invention also provide fiber-reinforced polymeric composite materials made by the methods described herein. Additional embodiments provide articles of manufacture comprising the fiber-reinforced polymeric composite material. For example, the article of manufacture may be a vehicle.

Additional embodiments of the present invention provide an initiator composition comprising, consisting essentially of, or consisting of at least one peroxy ester as described herein, at least one organic amine as described herein, and optionally at least one mercaptan compound as described herein. The initiator composition may optionally include one or more phase-stabilizing and/or pH-stabilizing additives. Such phase-stabilizing and/or pH-stabilizing additives are well-known in the art. The peroxy ester(s) and organic amine(s) are preferably not packaged together in the same container, as they would not be stable together for long periods of time. Embodiments of the initiator composition may be used in accordance with the methods described herein. According to particular embodiments, a method of using the initiator composition comprises mixing the initiator composition with at least one (meth)acrylic monomer (and optionally at least one (meth)acrylic polymer) to form a liquid prepolymer composition; and wetting a fibrous material with the liquid prepolymer composition.

According to one embodiment, the method comprises, consists essentially of, or consists of dissolving at least one meth(acrylic) polymer (e.g., PMMA) in at least one meth(acrylic) monomer (e.g., MMA); mixing a peroxy maleic acid peroxide initiator, ethylene dimercaptoacetate and a base (e.g., tri-n-butylamine) into the PMMA/MMA resin; wetting a fibrous material with the liquid resin, and processing the wetted material into a composite in accordance with any traditional method (preferably a closed mold technique such as infusion or RTM). The resin begins to polymerize (cure) at room temperature (or optionally at temperatures up to about 80° C. at low pressures, or at higher temperatures at elevated pressures). After sufficient time is allowed for cure and cooling, the part is removed. According to particular embodiments, the cure time is between about 10 minutes and about 15 minutes at room temperature. Cure time may be as short as 5 minutes at 15-25° C.

As used herein, unless specified otherwise, the values of the constituents or components of the compositions are expressed in weight percent or percent by weight of each ingredient in the composition.

The embodiments described herein are intended to be exemplary of the invention and not limitations thereof. One skilled in the art will appreciate that modifications to the embodiments and examples of the present disclosure may be made without departing from the scope of the present disclosure.

The embodiments of the invention are described above using the term "comprising" and variations thereof. However, it is the intent of the inventors that the term "comprising" may be substituted in any of the embodiments described herein with "consisting of" and "consisting essentially of" without departing from the scope of the invention.

Unless specified otherwise, all values provided herein include up to and including the starting points and end points given.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The following examples further illustrate embodiments of the invention and are to be construed as illustrative and not in limitation thereof.

The invention further includes the following embodiments.

1. A method of making a fiber-reinforced polymeric composite material comprising:
    wetting a fibrous material with a liquid prepolymer composition comprising at least one (meth)acrylic monomer, at least one base, and at least one peroxy ester initiator; and
    polymerizing the liquid prepolymer composition to form a fiber-reinforced polymeric composite material.
2. The method of claim 1, wherein the liquid prepolymer composition further comprises at least one (meth) acrylic polymer.
3. The method of any of claims 1 to 2, wherein the at least one base comprises at least one organic amine.
4. The method of any claims 1 to 3, wherein the wetting and polymerizing steps occur in a closed mold.
5. The method of any claims 1 to 4, wherein the liquid prepolymer composition further comprises at least one mercaptan compound.
6. The method of any claims 1 to 5, wherein the liquid prepolymer composition comprises ethylene glycol dimercaptoacetate.
7. The method of any of claims 3 to 6, wherein the at least one organic amine comprises one or more trialkyl amines.
8. The method of any of claims 3 to 6, wherein the at least one organic amine comprises tri-n-butylamine.
9. The method of any of claims 1 to 8, wherein the at least one peroxy ester comprises an ester of peroxymaleic acid.
10. The method of any of claims 1 to 9, wherein the at least one peroxy ester comprises a t-butyl ester of peroxymaleic acid.
11. The method of any of claims 2 to 10, wherein the at least one (meth)acrylic polymer comprises a homo- or co-polymer of methyl methacrylate (MMA), or a mixture thereof.
12. The method of any of claims 1 to 11 comprising polymerizing the liquid prepolymer composition at room temperature.
13. The method of any of claims 3 to 12, wherein the amount of the at least one organic amine in the liquid prepolymer composition is between about 0.01 phr and about 1.0 phr.
14. A fiber-reinforced polymeric composite material made by the method of any of claims 1 to 13.
15. An article of manufacture comprising the fiber-reinforced polymeric composite material of claim 14, wherein the article of manufacture is a vehicle.
16. A liquid resin composition comprising:
    at least one (meth)acrylic monomer,
    at least one base, and
    at least one mercaptan compound.
17. The liquid resin composition of claim 16 further comprising at least one (meth)acrylic polymer.
18. The liquid resin composition of any of claims 16 to 17, wherein the at least one base comprises at least one organic amine.
19. The liquid resin composition of claim 18, wherein the at least one organic amine comprises one or more trialkyl amines.
20. The liquid resin composition of claim 18, wherein the at least one organic amine comprises tri-n-butylamine.
21. The liquid resin composition of any of claims 16 to 20, wherein the at least one mercaptan compound comprises ethylene glycol dimercaptoacetate.
22. The liquid resin composition of any of claims 17 to 21, wherein the at least one (meth)acrylic polymer comprises a homo- or co-polymer of methyl methacrylate (MMA), or a mixture thereof.
23. The liquid resin composition of any of claims 18 to 22, wherein the amount of the at least one organic amine in the composition is between about 0.01 phr and about 1.0 phr.
24. An initiator composition comprising:
    at least one peroxy ester initiator;
    at least one organic amine; and
    optionally one or more phase-stabilizing and/or pH-stabilizing additives.
25. The initiator composition of claim 24 further comprising at least one mercaptan compound.
26. The initiator composition of any of claims 24 to 25, wherein the at least one peroxy ester comprises a hemi ester of a peroxy dicarboxylic acid.
27. The initiator composition of any of claims 24 to 25, wherein the at least one peroxy ester comprises a hemi t-butyl ester of peroxymaleic acid.
28. The initiator composition of any of claims 24 to 27, wherein the at least one organic amine comprises one or more trialkyl amines.
29. A method of using the initiator composition of any of claims 24 to 28 comprising mixing the initiator composition with at least one (meth)acrylic polymer and at least one (meth)acrylic monomer to form a liquid prepolymer composition; and wetting a fibrous material with the liquid prepolymer composition.

Examples

In the following Examples, different systems for curing Elium® resin were screened to determine if a gel time (also referred to herein as cure time) of between about 10 minutes to about 15 minutes could be achieved at room temperature. Luperox® PNP25, a 25% dispersion of t-butyl peroxymaleic acid (PMA) in Eastman Texanol Isobutyrate (TXIB®) plus additional phase- and pH-stabilizing additives, was used as an initiator. Such phase-stabilizing and/or pH-stabilizing additives are well-known in the art. A base (e.g., tri-n-butylamine) was used as a promoter. Ethylene glycol dimercaptoacetate (EGDMA) was used as an accelerator/chain transfer agent. Each component was included in the amounts shown in the tables below.

Experiments were done using Shyodu® equipment. The Elium® resin consisted of 23 phr of a polymethymethacrylate polymer (comprising of more than 70% MMA monomer units) dissolved in 77 parts acrylic monomer (comprising of more than 70% methyl methacrylate monomer) inhibited by MEHQ (hydroquinone monomethyl ether). The Elium® resin was weighed in an aluminium pot, and then the EGDMA and a liquid amine were added to the resin and mixed. Finally, Luperox® PNP25 was added and mixed. Different liquid amines were tried, namely, tri-n-butylamine, tri-n-ethylamine, N,N-dimethylaniline, and N,N-diethylhydroxylamine. The results obtained with tri-n-butylamine are provided in the tables below.

In the text below, "gel time" is used in a different sense than typically employed in the art. As used herein, "gel time" means the point at which rotation stops using Shyodu gel pot apparatus at ambient temperature.

"Peak time" and "Cure time" are used interchangeably herein and are defined as the time when the resin or composite part being cured reaches the maximum temperature.

Example 1

The tri-n-butylamine provided gel times of between about 10 minutes and about 15 minutes for the Elium® resin. As shown in Table 1, at 0.3 phr tri-n-butylamine, the gel time was below 15 minutes and peak time was about 32 minutes. Increasing the amount of tri-n-butylamine unexpectedly led to an increase of both gel time and peak time.

TABLE 1

| Tri-n-butylamine (phr) | EGDMA (phr) | Luperox PNP25 (phr) | Gel time (min) | Temperature at gel time (° C.) | Exothermic peak (° C.) | Peak time (min) |
|---|---|---|---|---|---|---|
| 0.3 | 0.3 | 4 | 14.6 | 40 | 118 | 32 |
| 0.5 | 0.3 | 4 | 21.1 | 32 | 121 | 54 |
| 0.8 | 0.3 | 4 | 48.1 | 29 | 131 | 101 |

FIG. 1 illustrates the amount of time it took the Elium® resin to cure at different amounts of tri-n-butylamine. The results indicate that the tri-n-butylamine can provide a gel time of the Elium® resin that can be as short as about 15 minutes, and that the loading of tri-n-butylamine can be used to control gel time and thus cure. When the amount of EGDMA was reduced to 0.1 phr (at 0.3 phr tri-n-butylamine and 4 phr Luperox® PNP25), gel time was about 23 minutes and peak time was about 54 minutes.

Example 2

Different amounts of EGDMA were screened, as shown in Table 2 below.

TABLE 2

| Tri-n-butylamine (phr) | EGDMA (phr) | Active perester (phr) | Luperox PNP25 (phr) | Gel Time (min) | Temperature at gel time (° C.) | Exothermic peak (° C.) | Peak time (min) |
|---|---|---|---|---|---|---|---|
| 0 | 0.3 | 1 | 4 | 16.0 | 82 | 127 | 23 |
| 0.2 | 0.1 | 1 | 4 | 19.5 | 46 | 102 | 45 |
| 0.2 | 0.2 | 1 | 4 | 14.1 | 53 | 121 | 25 |
| 0.2 | 0.3 | 1 | 4 | 12.3 | 79 | 135 | 23 |
| 0.2 | 0.4 | 1 | 4 | 14.4 | 75 | 132 | 19 |

As shown in Table 2, at about 0.2 phr of tri-n-butylamine, about 0.3 phr of EGDMA and about 4 phr of Luperox® PNP25, the gel time was about 12-13 minutes and the peak time was about 23 minutes.

In accordance with some embodiments of the invention, the tri-n-butylamine combined with EGDMA resulted in a gel time of less than 15 minutes.

What is claimed is:

1. A method of making a fiber-reinforced polymeric composite material comprising:
   wetting a fibrous material with a liquid prepolymer composition comprising
      at least one (meth)acrylic monomer,
      at least one base, at least one peroxy ester comprising an ester of peroxymaleic acid, and
      at least one mercaptan compound comprising ethylene glycol dimercaptoacetate as an accelerator/chain transfer agent; and
   polymerizing the liquid prepolymer composition to form the fiber-reinforced polymeric composite material at room temperature, where room temperature is defined as from 20° C. to 30° C.

2. The method of claim 1, wherein the liquid prepolymer composition further comprises at least one (meth)acrylic polymer.

3. The method of claim 1, wherein the at least one base comprises at least one organic amine.

4. The method of claim 1, wherein the wetting and polymerizing occur in a closed mold.

5. The method of claim 3, wherein the at least one organic amine comprises one or more trialkyl amines.

6. The method of claim 3, wherein the at least one organic amine comprises tri-n-butylamine.

7. The method of claim 1, wherein the at least one peroxy ester comprises at-butyl ester of peroxymaleic acid.

8. The method of claim 2, wherein the at least one (meth)acrylic polymer comprises a homo- or co-polymer of methyl methacrylate (MMA), or a mixture thereof.

9. The method of claim 3, wherein the amount of the at least one organic amine in the liquid prepolymer composition is between about 0.01 phr and about 1.0 phr.

10. The method of claim 1,
- wherein the at least one base comprises at least one organic amine;
- wherein the at least one organic amine in the liquid prepolymer composition is present in an amount between 0.05 phr and 0.7 phr;
- wherein the at least organic amine comprises one or more trialkyl amines; and
- wherein the ethylene glycol dimercaptoacetate is present in an amount between 0.1 and 0.5 phr.

* * * * *